United States Patent [19]

Brewer

[11] Patent Number: 5,299,748
[45] Date of Patent: Apr. 5, 1994

[54] APPARATUS AND METHOD FOR REDUCING VEHICLE TIRES TO PARTICLES

[75] Inventor: John C. Brewer, Salt Lake City, Utah
[73] Assignee: Garb Oil & Power Corporation, Salt Lake City, Utah
[21] Appl. No.: 909,038
[22] Filed: Jul. 6, 1992
[51] Int. Cl.$^5$ ............................................. B02C 19/12
[52] U.S. Cl. ................................... 241/279; 241/280; 241/DIG. 37; 157/13; 157/16
[58] Field of Search ......... 241/23, 279, 280, DIG. 37; 157/13, 16; 83/951

[56] References Cited

U.S. PATENT DOCUMENTS

| | | | |
|---|---|---|---|
| 2,937,676 | 5/1960 | Smyser | 157/13 |
| 3,578,252 | 5/1971 | Brewer | 241/141 |
| 3,614,969 | 10/1971 | Breiner | 157/16 |
| 3,693,894 | 9/1972 | Willette | 241/279 |
| 4,813,614 | 3/1989 | Moore et al. | 241/23 |

FOREIGN PATENT DOCUMENTS 8803866 6/1988 World Int. Prop. O. ............. 157/13

Primary Examiner—Mark Rosenbaum
Assistant Examiner—John M. Husar
Attorney, Agent, or Firm—Mallinckrodt & Mallinckrodt

[57] ABSTRACT

An apparatus for reducing extra large vehicle tires to particles or to prepare them for recapping comprises a tire holder assembly, made up of a set of dual jacks, in combination with a rotary cutter blade assembly made up of a side-by-side series of discs carrying cutter blades of chisel type. The set of dual jacks are preferably carried by an arbor having opposite shaft ends adapted to matingly interconnect with corresponding ends of a motivating shaft for quick and easy interchange of one size tire holder assembly for another size. When the tire is to be recapped, arcuate attachments are secured to members of the tire holder assembly that contact a tire bead so as to preserve the circumferential integrity of such bead during cutting, and the cutter blade assembly is replaced by wire buffing brushes following removal of the tread portion of the tire by cutting. An optional feature of the invention is the freezing of the tire prior to cutting, so that steel reinforcing materials as well as the elastomeric material of the tire can be easily reduced to particles.

22 Claims, 14 Drawing Sheets

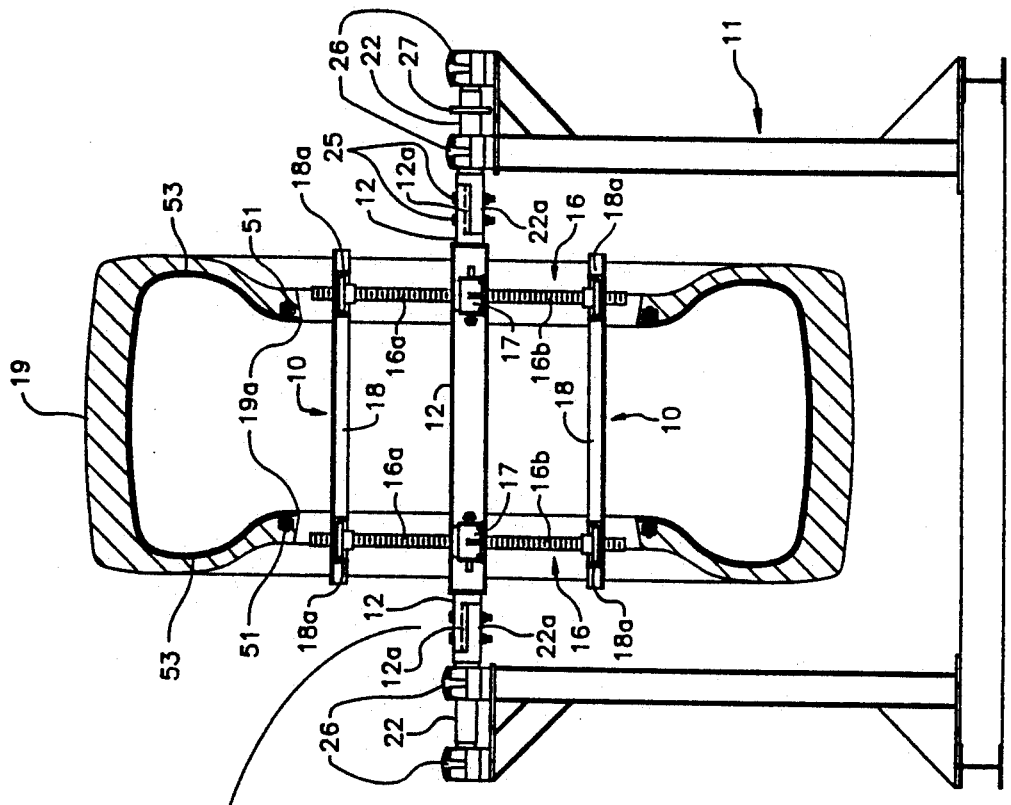
FIG. 4
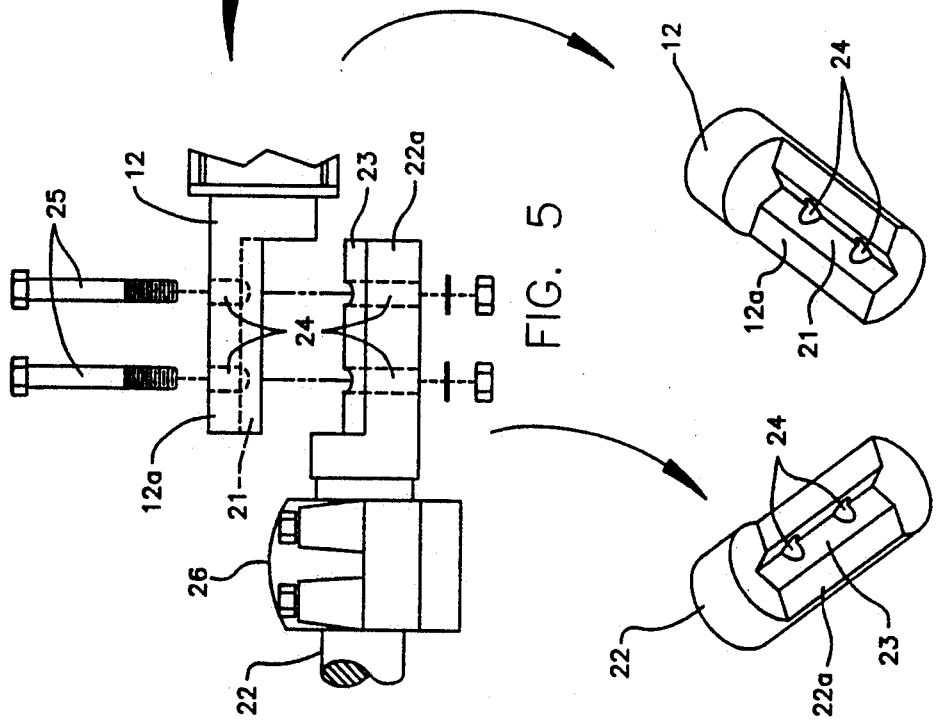
FIG. 5
FIG. 6
FIG. 7

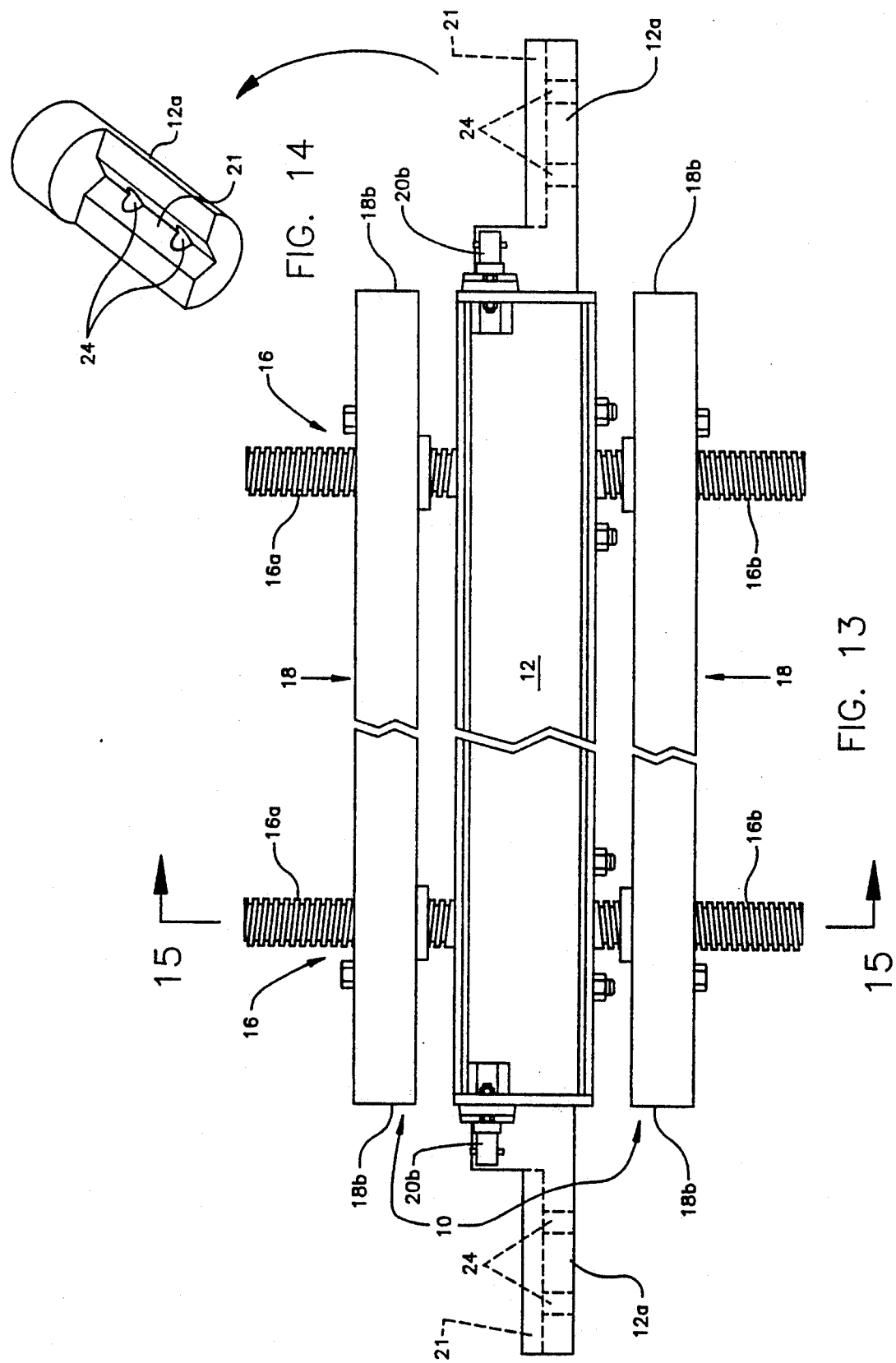

APPARATUS AND METHOD FOR REDUCING VEHICLE TIRES TO PARTICLES

BACKGROUND OF THE INVENTION

1. Field

The invention is in the field of usefully disposing of used vehicle tires by at least partially subjecting them to disintegration by cutting particles therefrom as an assembly of cutter blades is rotated against a rotating tire.

2. State of the Art

Many types of vehicle tire-cutting machines have been developed in the past f or the purpose of so-called "shredding" of tires to be disintegrated. The most usual arrangements provide for feeding the tires between a rotating assembly of circular blades and a stationary assembly of heavy discs spaced apart to receive the blades and to provide anvils against which the tires are pressed by the rotating blades as they cut through the tire bodies, see my U.S. Pat. No. 3,578,252 issued May 11, 1971. However, these shredding machines cannot handle the very large and heavy tires used on various industrial vehicles.

The closest prior art known to applicant is Willette U.S. Pat. No. 3,693,894 of Sep. 26, 1972 entitled "Tire Shredder", wherein a number of tires to be shredded are arranged side-by-side on a tire holder having extendable and retractable hydraulic ram members radiating from a central hub and carrying respective longitudinal arms that extend transversely through the interiors of the several tires to collectively clamp against the circumferential beads thereof for holding the tires during the cutting operations, the length of such arms being dependent upon the number of tires held side-by-side on the tire holder which is rotated relative to a rotating assembly of elongate serrated blades, the longitudinal length of such blades also being dependent upon the number of tires held by the tire holder. This apparatus is incapable of handling the very large and heavy tires that have heretofore not been capable of being effectively disintegrated.

SUMMARY OF THE INVENTION

Accordingly, a principal objective in the making of the present invention was to provide a vehicle tire cutting machine capable of cutting tires used on very large industrial vehicles into easily handled particles.

In accordance with the invention, a highly versatile apparatus is provided for both holding and rotating a tire, or a unitary assembly of multiple sidewalls of tires whose tread portions have been cut, while a circular assembly of chisel-type cutter blades that project circumferentially from the assembly is rotated counter to and at a considerably higher speed than the tire. The machine slices out in chisel fashion particles of the tread of the tire inwardly thereof from the circumferential tread face of the tire, normally leaving only the side walls of the tire for subsequent handling. However, in those instances in which the tire is recappable, cutting is stopped short of the reinforced body and sidewalls of the tire and progresses thereafter by replacement of the blade assembly with a row of wire buffing brushes to further prepare the tire for retreading.

Tire side wall bead sections left following cutting through the tread and underlayment of the tire body are, in accordance with the invention, reinserted in the tire-holder part of the apparatus and held together, side-facings to side-facings. Operation of the apparatus thereupon slices such assembled side wall portions of the tire into particles.

In contrast to the previously mentioned Willette apparatus, the apparatus of the present invention utilizes a unique combination of tire holder assembly and tire cutter blade assembly that is especially adapted to the effective handling, individually, of exceptionally large diameter and heavy tires that have very wide treads, such as are used on unusually large and heavy industrial trucks and other equipment and which have heretofore not been capable of being effectively disintegrated. However, the apparatus of the invention can also handle to good advantage the smaller tires customarily handled by presently available tire shredding machines.

A feature of the apparatus of the invention is the utilization, in the tire holder assembly, of a paired set of dual, radial, tire-holding jacks, each corresponding pair of jacks of the paired set of dual jacks being mounted by an elongate, rigid, clamping frame at opposite ends thereof and operative with respect to corresponding side wall beads of a received tire, so clamping pressure will be substantially equal on such beads and substantially equal along the length of such clamping frame with respect to the several single, residual, side walls of a side-by-side group of such residual side walls when mounted together in the apparatus for cutting, and so that opposite ends of each of the opposite ends of such frame are spaced apart along a chord of the circumference of the corresponding bead of the received tire, whereby tires of various sizes can be readily handled by the apparatus. Such corresponding jacks of the paired set of dual jacks are preferably mounted in mutually spaced, side-by-side relationship in common by elongate arbor structure provided for endwise mating with motorized shaft components to make for rapid and convenient replacement of one such tire holder assembly with another of different size.

Another feature of the apparatus of the invention is the makeup of the rotary butter blade assembly thereof, wherein a series of blade-holding discs are arranged and held rigidly side-by-side on a common shaft, each disc having a circumferential series of chisel-type blades projecting therefrom for slicing into and dislodging particles of rubber from the tread of a tire that is normally held and rotated relative to such cutter blade assembly, or from a similarly held and rotated, side-by-side assembly of beaded side wall members of tires from which the tread and underlayment portions have been cut. In the cutter blade assembly, the individual cutter blades are offset laterally from one another to form a helically oriented series of blades.

Since most vehicle tires, particularly excessively large ones, are now reinforced with strands of steel, it is one of the objects of the invention to provide for cutting such strands regardless of how thick or blade-resistant they are. For this purpose, a feature of the invention is the enclosing of a circumferential portion of the tire by a hood and injecting within such hood a freezing agent, such as liquid nitrogen, to provide a cryogenic environment for the tire prior to being operated on by the cutter blade assembly.

The particles of rubber and steel cut from the tire are normally allowed to drop by gravity from the cutting zone onto the surface of an endless conveyor for discharge into a suitable collection chamber.

THE DRAWINGS

Embodiments of apparatus constituting what are presently regarded as the best modes of carrying out the invention in actual practice are illustrated in the accompanying drawings, in which:

FIG. 1 is a view in side elevation of the apparatus shown as holding a tire to be cut;

FIG. 2, a top plan view of the apparatus of FIG. 1;

FIG. 3, a view in elevation of the front end of the apparatus of FIGS. 1 and 2 as viewed from the left thereof and drawn to a somewhat larger scale;

FIG. 4, a view in vertical section taken on the line 4—4 of FIG. 1 and drawn to a larger scale;

FIG. 5, an exploded, fragmentary portion of FIG. 4 that is indicated by the arrow extending between FIGS. 4 and 5, the view being drawn to a larger scale;

FIGS. 6 and 7, bottom and top perspective views, respectively, of the mating shaft ends of FIG. 5 that are indicated by the arrows extending between FIGS. 5 and 6 and between FIGS. 5 and 7, respectively;

FIG. 8, a view in elevation, partly broken away, of an upper portion of the front end of the apparatus of FIGS. 1 and 2 showing part of the cutter blade assembly, the tire in the background not being shown;

FIG. 9, a view in vertical section taken on the line 9—9 of FIG. 8, a portion of the cutter blade assembly being shown in vertical section;

FIG. 10, an exploded fragmentary view in perspective of the portion of the cutter assembly that is shown in vertical section in FIG. 9;

FIG. 11, a top plan view of the cutter assembly part of the apparatus and of the frame mounting therefor as shown in FIG. 9 but drawn to a larger scale, the protective hood having been removed;

FIG. 12, a perspective view looking toward the front of the tire holder assembly part of the apparatus, sections of the supporting framework being broken away and the cutter blade assembly part of the apparatus not being shown, the view being drawn to a considerably larger scale;

FIG. 13, a view in side elevation of the tire holder assembly looking toward the forefront of FIG. 12, an intermediate portion being broken out for convenience of illustration;

FIG. 14, a perspective view looking from above at that portion of FIG. 13 indicated by the arrow that extends between FIGS. 13 and 14;

FIG. 15, a view in transverse axial vertical section taken on the line 15—15 of FIG. 13 through one of the dual jacks of the paired set of same of the tire holder assembly;

FIG. 16, a fragmentary view in longitudinal side elevation of the left-hand end portion of the portion of the tire holder assembly shown in FIG. 15;

FIG. 17, a view corresponding to that of FIG. 1 but showing a cryogenic embodiment of the apparatus which is equipped with a hood under which liquid nitrogen or similar freezing agent is injected;

FIG. 18, a view corresponding to that of FIG. 17, but showing how the hood can be drawn backwardly away from the remainder of the apparatus when the cryogenic feature is not required for a particular operation;

FIG. 19, a view corresponding to that of FIG. 4 but showing how the residual, beaded, side wall portions of tires sliced by the apparatus are themselves held for being sliced by the apparatus;

FIG. 20, a view corresponding to that of FIG. 3 but showing a wire brush and buffer assembly substituted for the cutter blade assembly; and FIG. 21, a view corresponding to a portion of FIG. 1 but taken with respect to the embodiment of FIG. 20 and showing how bead-shape-retaining attachments are applied to the parts of the tire holding assembly that contact the beads of a recappable tire being held for tread slicing and buffing.

DETAILED DESCRIPTION OF THE ILLUSTRATED EMBODIMENTS

Figure 1:
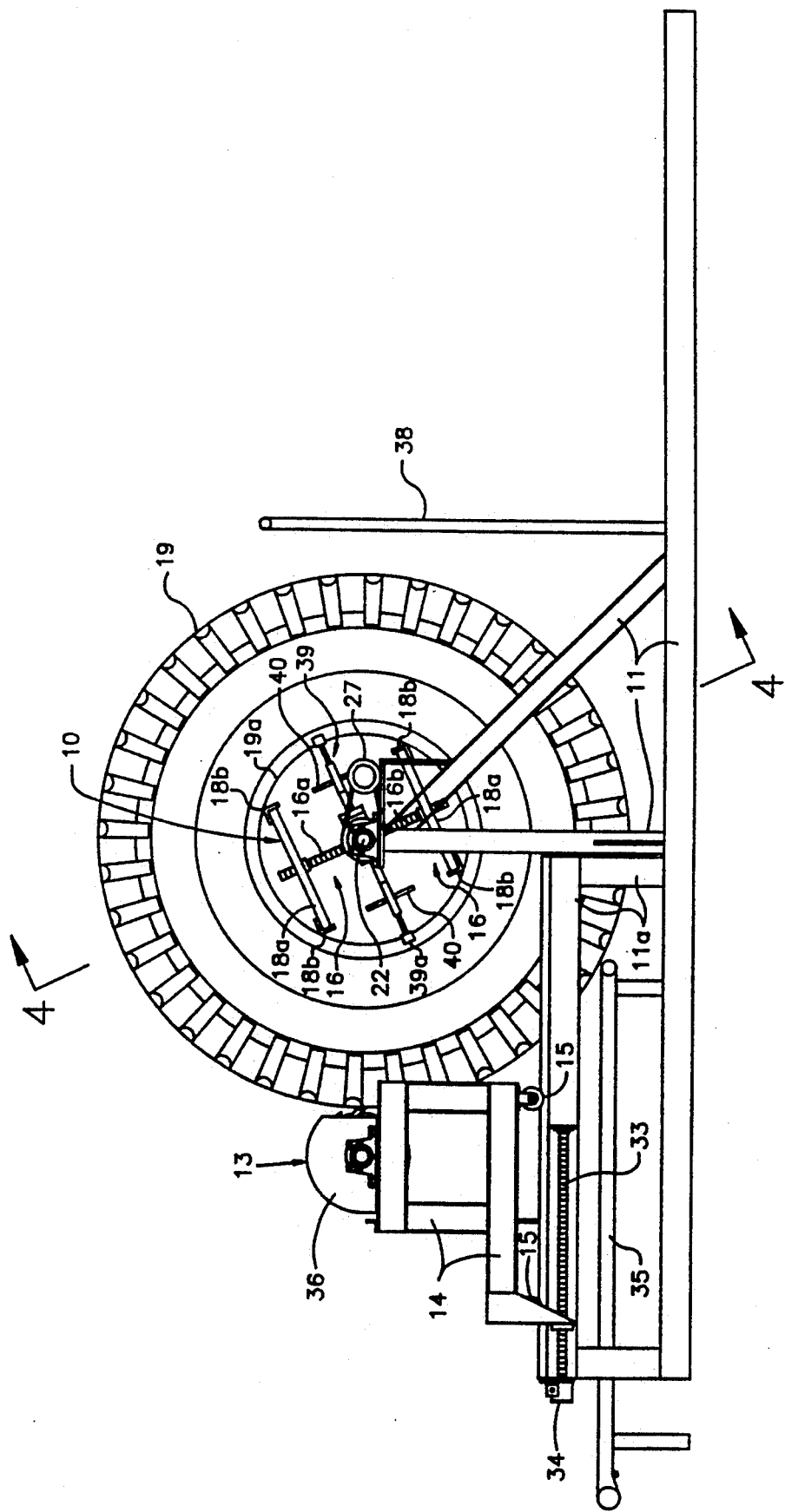
Figure 2:
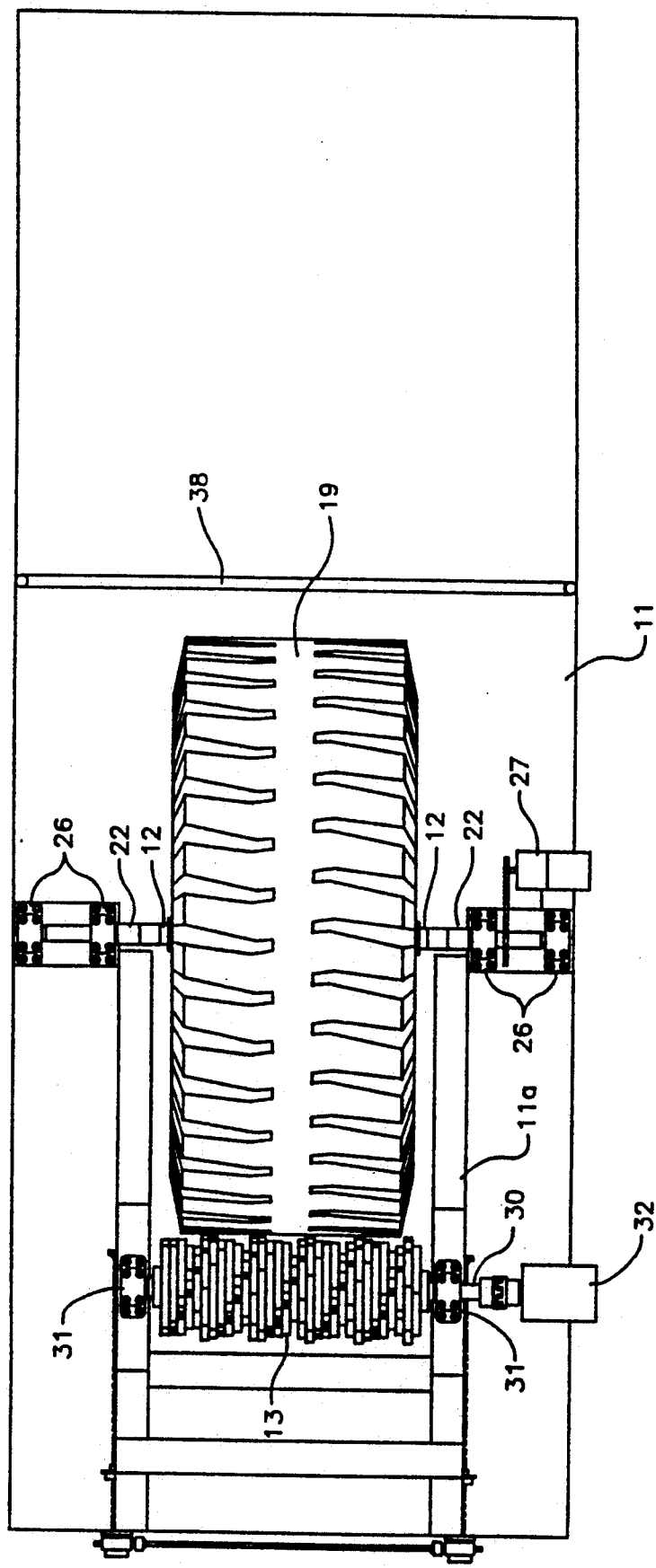
Figure 3:
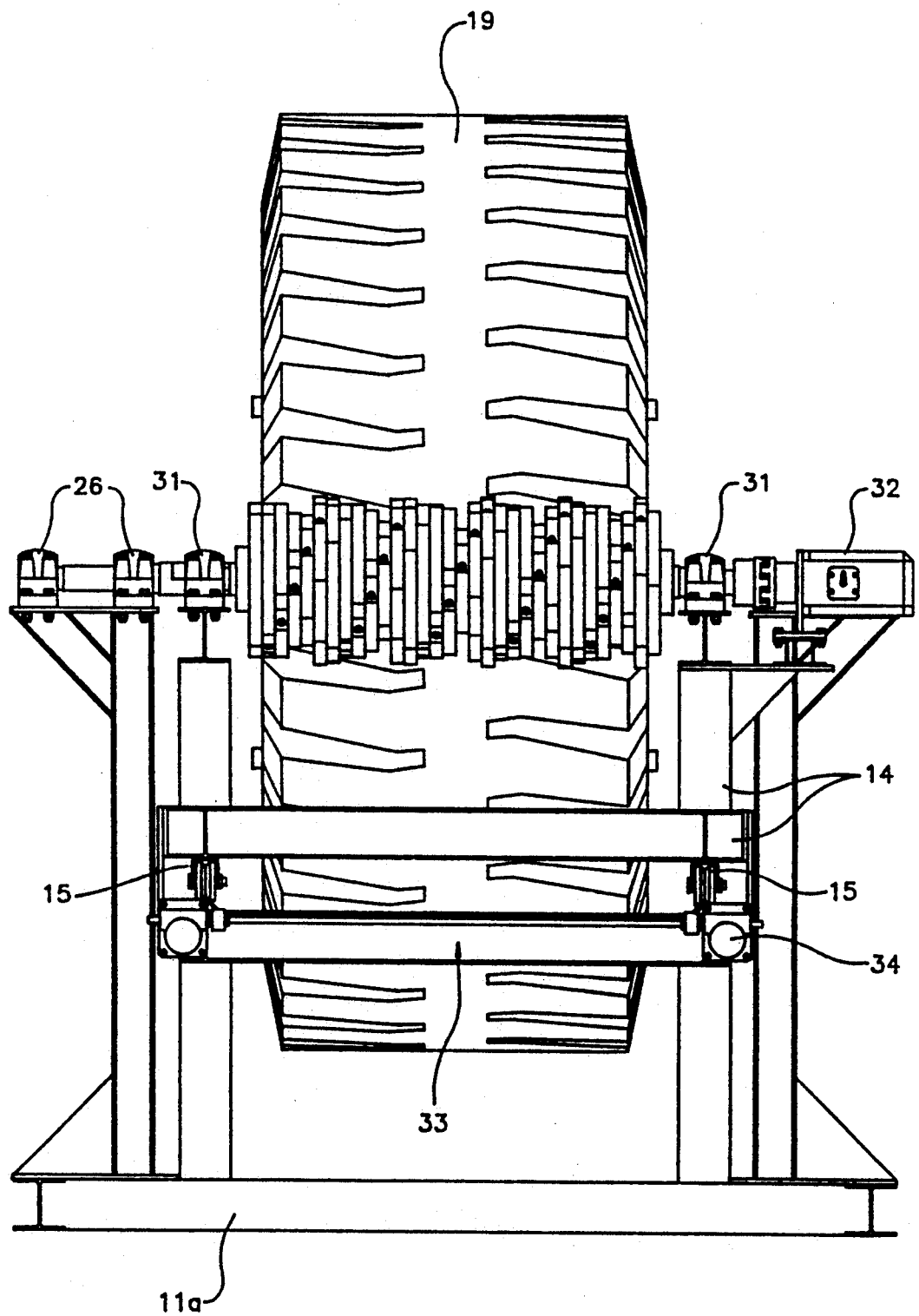
Figure 10:
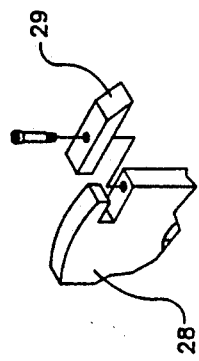
Figure 9:
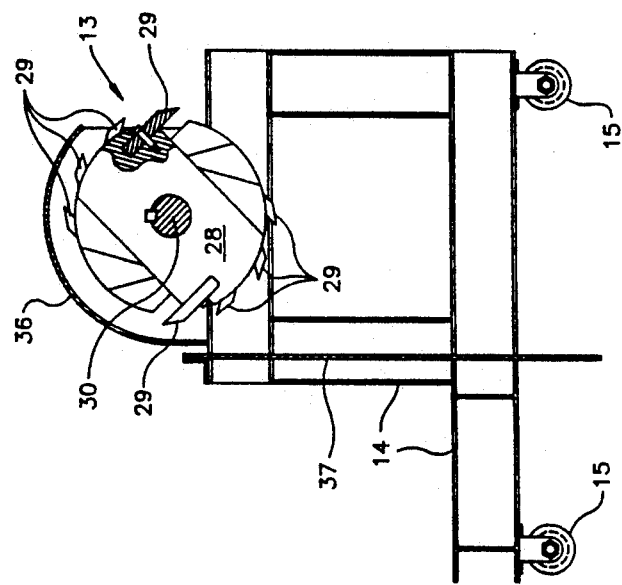
Figure 8:
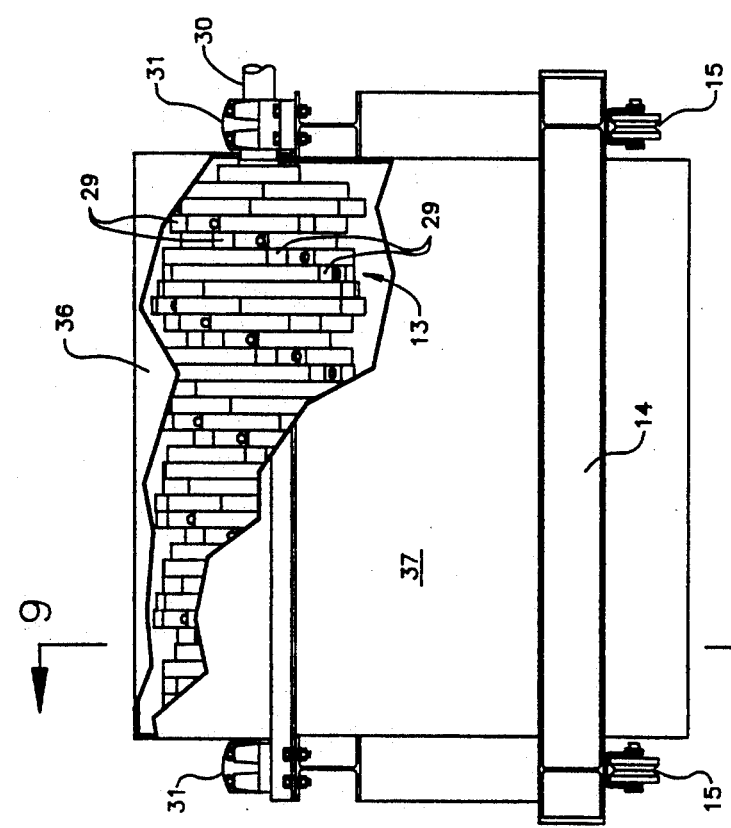
Figure 11:
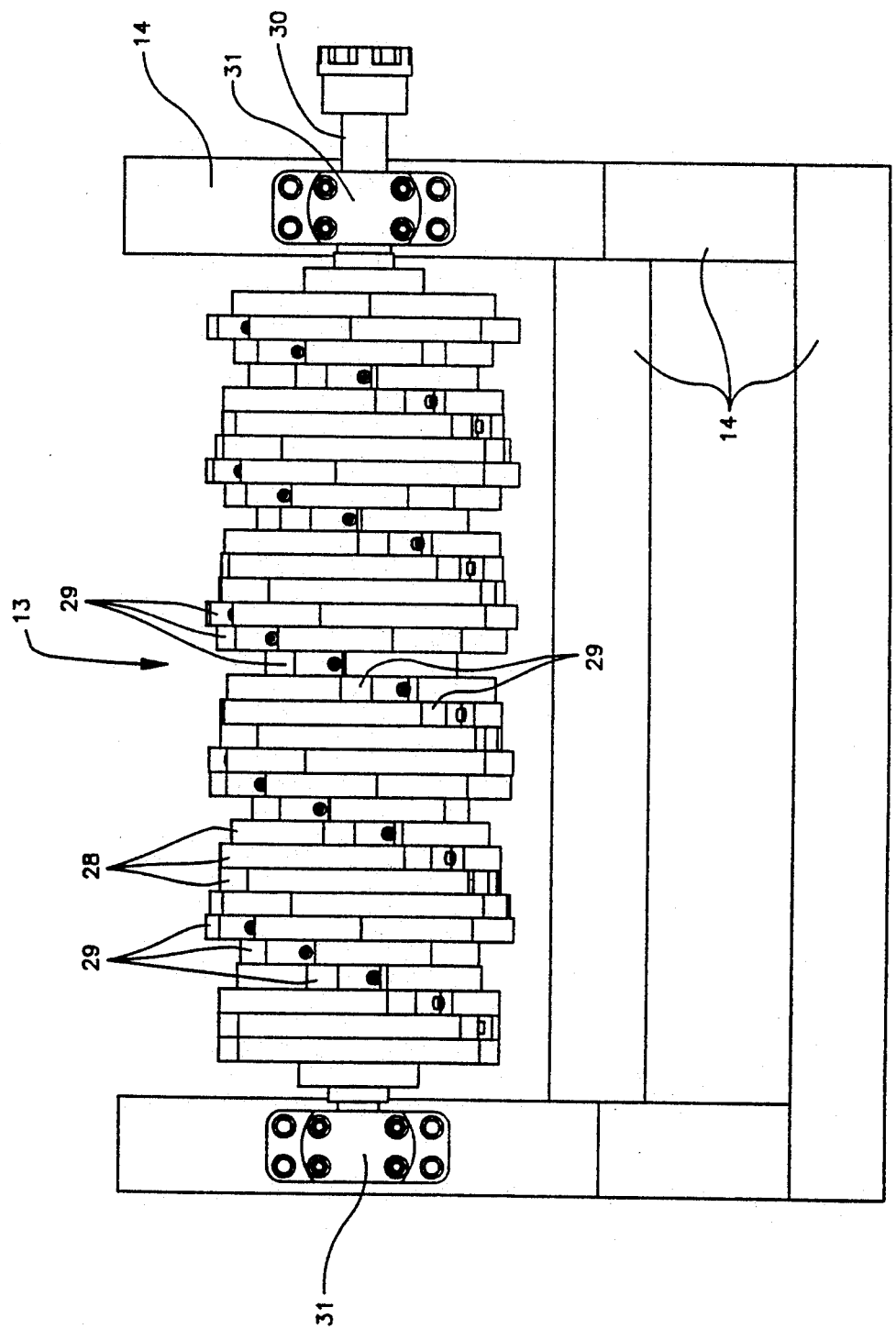

The embodiment of apparatus of the invention illustrated in FIGS. 1 to 16 comprises tire holding means in the form of a tire-holder assembly 10, FIGS. 1, 4, and 12-16, fixedly but rotatably mounted on a stationary frame 11 by means of an arbor structure 12, FIGS. 2 and 4 and tire cutting means in the form of a tire cutter assembly 13, FIG. 1, rotatably mounted on a sliding frame 14 arranged in this instance for extension toward and retraction away from the tire holder assembly 10. Sliding frame 14 has forward and rearward sets of wheels 15 arranged to move back and forth along a forward extension 11a of stationary frame 11.

Figure 12:
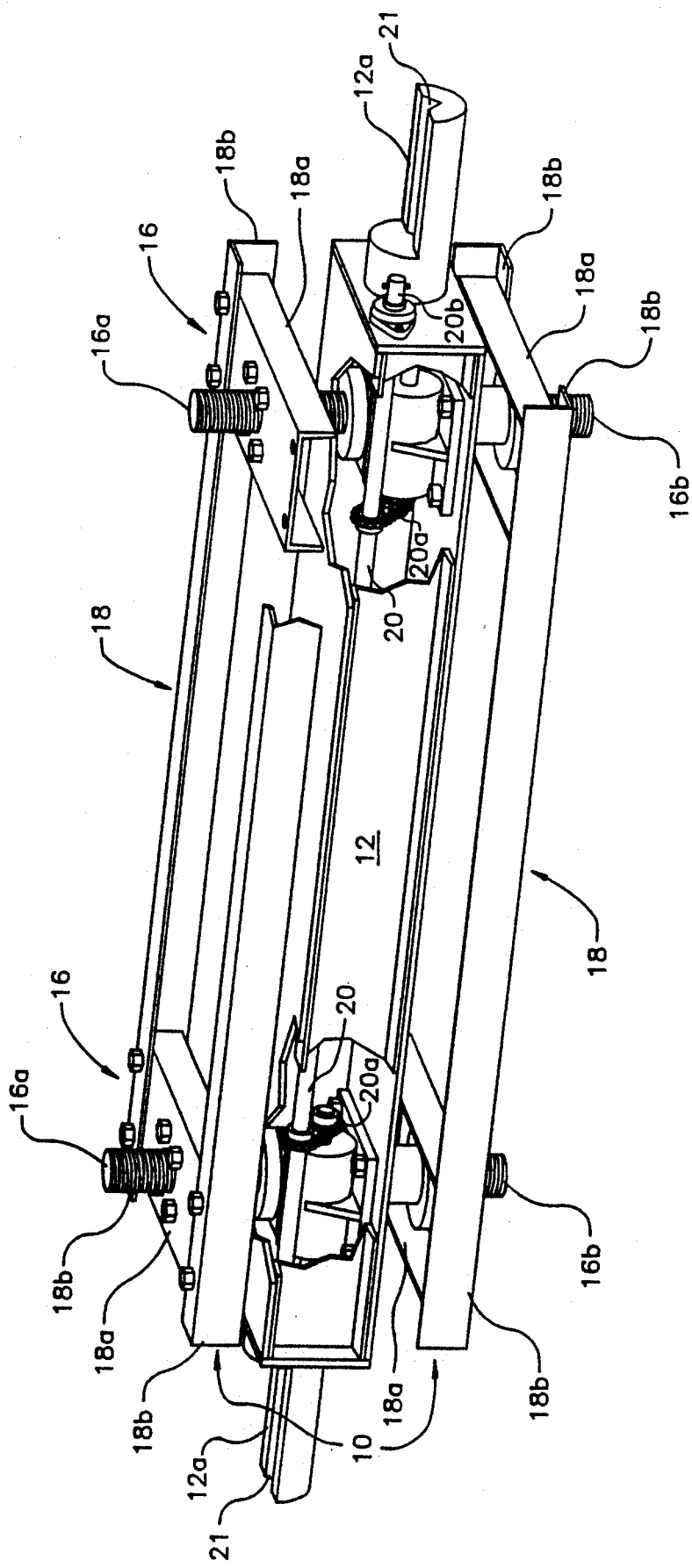
Figure 16:
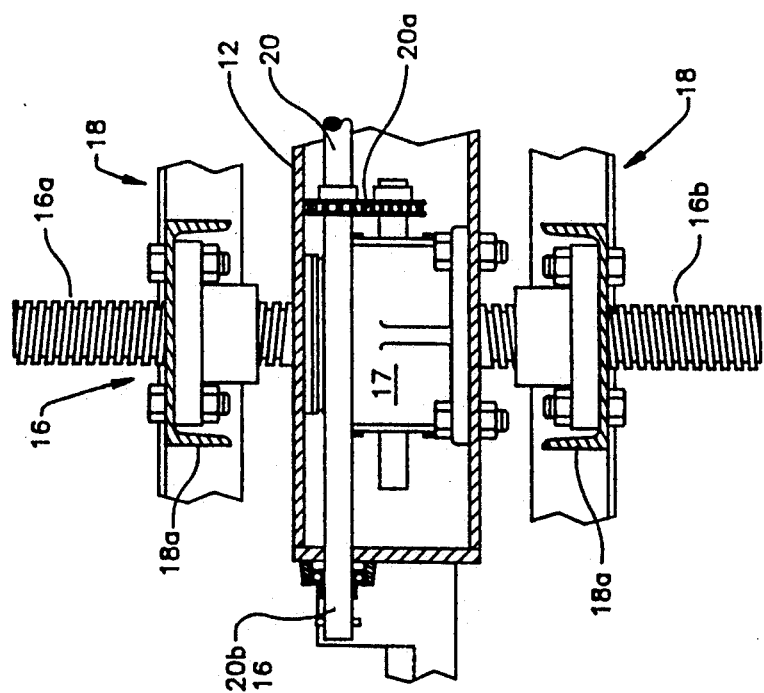
Figure 15:
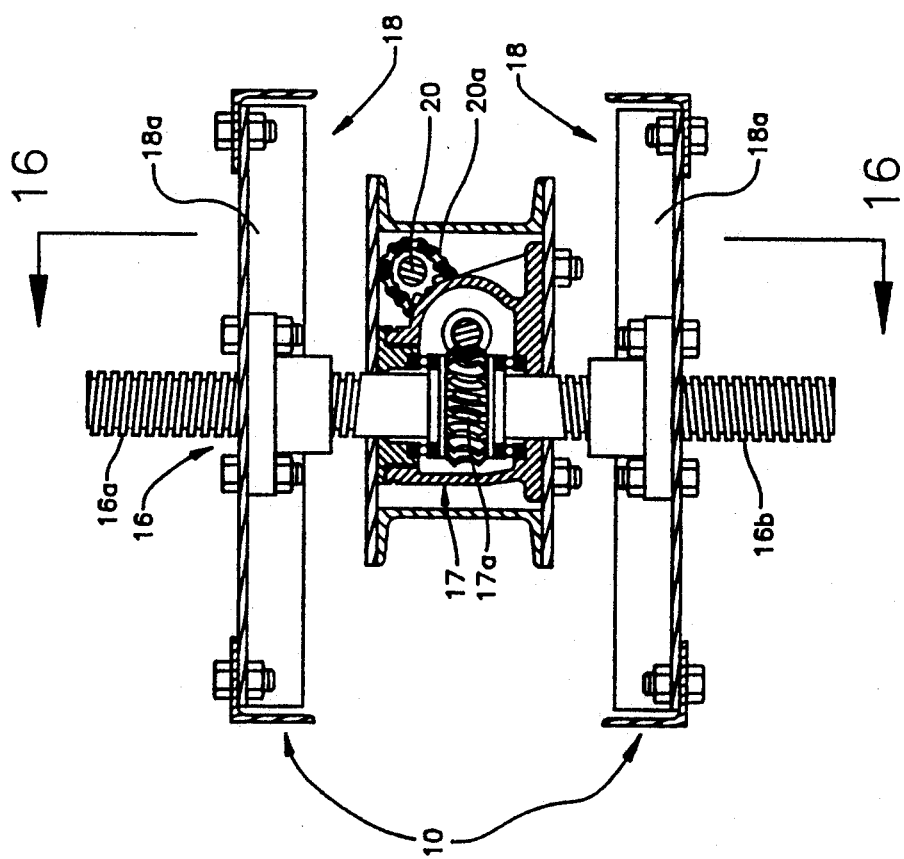

Tire holder assembly 10 comprises a paired set of dual tire holding jacks 16, respectively, FIGS. 1 and 4, each of said dual jacks 16 extending oppositely from a corresponding jack-operating mechanism 17, which is of conventional construction insofar as a single jack heretofore commercially available (Joyce/Dayton Corp., Dayton, Ohio) for a variety of purposes is concerned, such conventional construction being altered for purposes of the invention by the provision of an additional jack arrangement extending oppositely from the operating mechanism 17 to provide the dual jacks operated in common by such mechanism 17 by reason of a single shaft being threaded in opposite directions as illustrated in FIGS. 12, 15, and 16. Each of the mechanisms 17 has the usual gears 17a, FIG. 15, but here operates oppositely threaded, dual jack shaft portions 16a and 16b of the single shaft. When such single shaft is rotated in one way by the gear mechanism, the dual jacks of the paired set of same will all either be extended or retracted, and, when rotated in reverse, such dual jacks will all be actuated in reverse.

Figure 19:
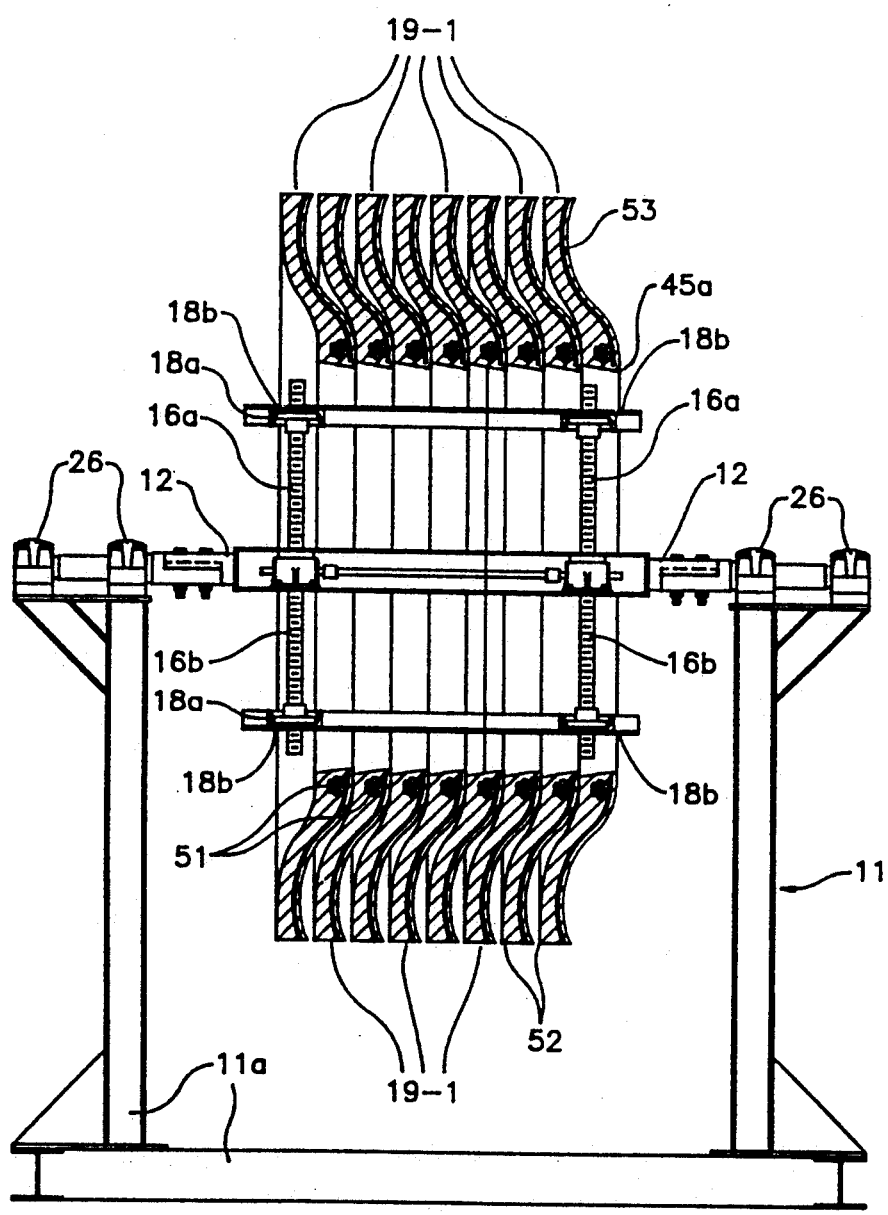

Each of the jack shaft portions 16a and 16b of the single operating jack shaft of each of the dual tire holding jacks 16 of the paired set of same carries, threaded thereon through a suitable hub member, FIGS. 15 and 16, an end piece 18a of a corresponding elongate, rigid, clamping frame 18, FIGS. 12 and 13, which has longitudinal side members 18b, respectively, for spanning the distance along the inside width of a received tire 19 between the component beads 19a of the tire, see FIG. 4, and constitute tire bead clamping means. Opposite ends or corners, (indicated by 18b as applied in FIGS. 1, 12, and 13) of opposite ends of frame 18 adjacent to end pieces 18a are mutually spaced apart by a distance that spans a chord of a corresponding circular bead 19a, FIG. 1, of a received tire 19 to be cut. The total length of such frame 18 between the bead clamping opposite ends thereof is such as to span the inside width of the tire, i.e., the distance between the inside circumferences of the component side wall beads of the tire, see FIG. 4, which means that grouped, residual, side wall portions 19-1, FIG. 19, of cut tires have their beads pressed by the longitudinal side members 18b of rigid frame 18 along their lengths when placed in the tire holder assembly 10.

The dual jacks 16 of the paired set of same are rigidly held in longitudinally spaced apart relationship by the mechanisms 17, FIG. 4, which are within an elongate housing portion 12, FIG. 4 of the journal structure. Such housing extends axially through the holder-mounted tire 19 and protectively houses such mechanisms 17 of the respective dual jacks 16. The rigid frames 18 also extend through the circular interior of the holder-mounted tire so that the corners see 18b as applied to FIG. 1, 12 and 13, of their respective opposite ends contact the corresponding beads of the tire at the ends of the respective chords spanned by such frame ends of the tire holder assembly 10.

Mechanisms 17 of the respective dual jacks 16 of the paired set of same are operatively interconnected by a shaft 20, FIG. 12, and by respective sprocket assemblies 20a. Opposite ends 20b of shaft 20 project exteriorly of arbor housing structure 12 for receiving a handcrank (not shown) at such times as the dual jacks 16 are to be either extended or retracted relative to the corresponding beads 19a of a holder-mounted tire 19.

In accordance with the invention, the tire holder assembly is preferably constructed for quick and easy replacement by others that are sized, respectively, to handle various desired tire sizes. For this purpose, the opposite ends of arbor 12 of each size of tire holder assembly are configurated as partial stub shafts for endwise mating with matingly configured portions of motorized shaft components. As illustrated, it is preferred to have such stub shaft opposite ends of arbor 12 semi-circular in formation, see 12a, FIGS. 5 and 8, with a longitudinally extending V-formation 21, here shown as a valley, for receiving respective matingly-formed ends 22a, FIGS. 5 and 7, of a motorized shaft 22 that is provided with a gap along its length for receiving such journal 12. The mating V-formations 23 of the respective ends 22a are, in this instance, V-ridges adapted to fit into the respective V-valleys 21. Longitudinally spaced, transverse holes 24 are provided through the mating journal and motorized shaft ends 12a and 22a, respectively, to receive bolts 25, FIG. 5, in the mated condition thereof. Motorized shaft 22 is journaled in bearings 26 and provided with a motor drive 27, FIGS. 1, 2, and 4.

Although the above form of apparatus provided with mating stub shafts for quick and easy connection to corresponding matingly formed ends of corresponding shaft portions 22 is preferred, the stub shafts protruding from opposite ends of arbor 12 can be elongated to themselves take the place of such shaft portions 22, or the housing portion of the arbor can be a motor driven shaft throughout with mechanisms 17 suitably interposed intermediate its length.

The tire cutter assembly 13 is constructed and arranged to slice particles, usually of a size approximately 2 inches by 2 inches in area by ¼ inch in depth from the tread of a very large tire, as at 19, typically 150 inches in diameter. It is made up of a side-by-side series of partially circular, cutter plates 28, FIGS. 2, 3, and 8-11, each having one or more, but usually a pair, as shown, of diametrically disposed blades 29 of chisel formation projecting from its periphery, see particularly FIGS. 9 and 10. As here shown, the cutter plates 28 are keyed to a shaft 30 in common, which shaft is journaled in bearings 31 and driven by a motor 32, FIG. 2. Assembly 13 is mounted on frame 14 for movement along frame extension 11a toward and away from a tire (19) held by tire-holder assembly 10. Movement toward and away from the tire is effected manually by turning a screw mechanism 33, FIGS. 1 and 3, by means of a motor 34.

Tire holder assembly 10 with a tire mounted thereon is rotated differentially as to speed relative to tire cutter assembly 13, the speed differential being typically 3 to 12 RPM for the former and 1200 RPM for the latter. Particles sliced from the tread of the tire, or from the beaded sidewall portions thereof, see 19-1, FIG. 19, as separately mounted and held by the holder assembly 10, fall onto a conveyor belt 35, FIG. 1, for transport to a suitable collecting zone. For safety purposes, it is desirable to provide a hood 36 and a drop curtain 37 for the cutter assembly 13, see especially FIGS. 8 and 9, and a back drop 38, FIG. 1, for the tire holder assembly.

Figure 17:
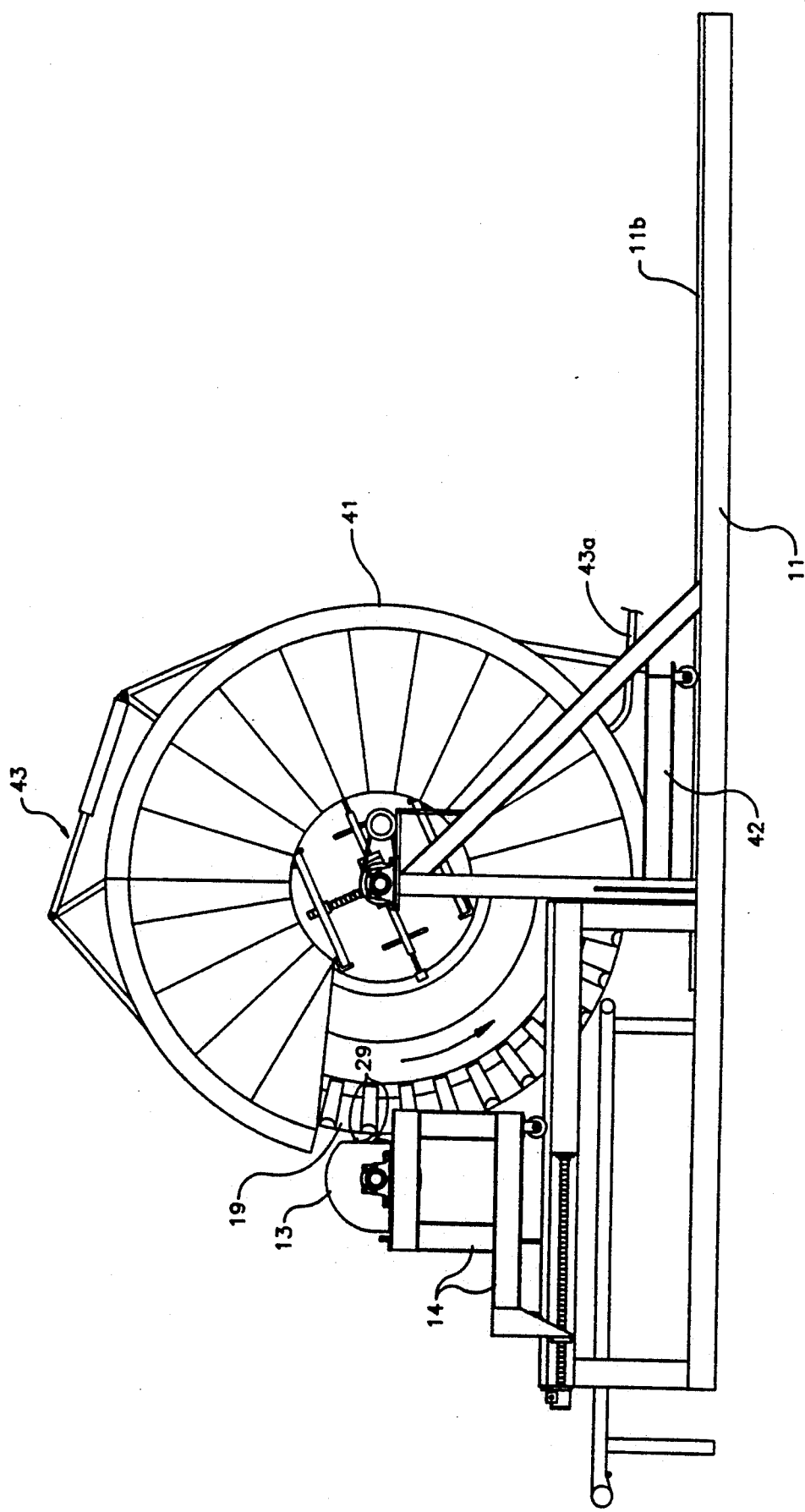
Figure 18:
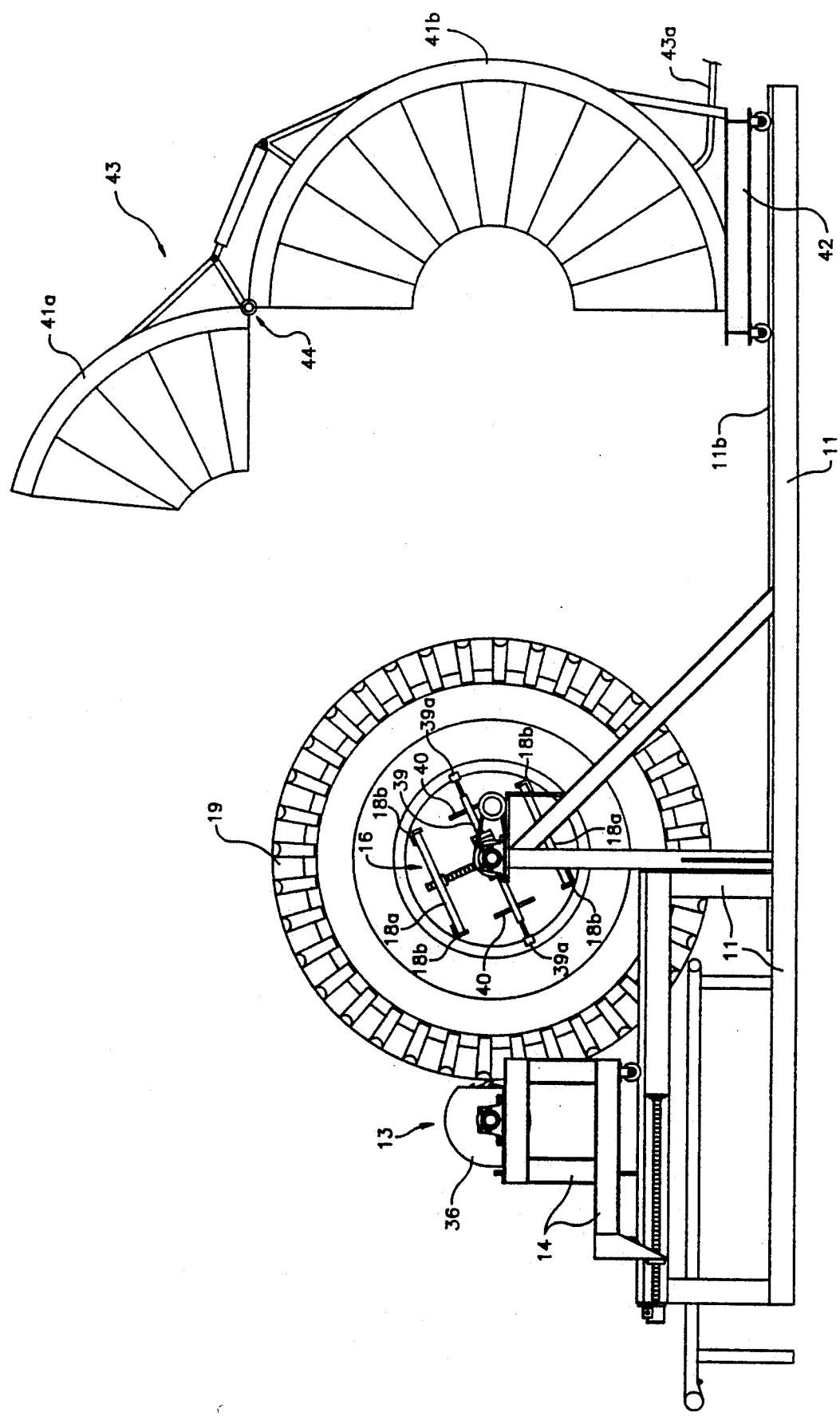

It is advantageous to provide an additional pair of dual jacks 39, FIG. 1, 17 and 18 for positioning diametrically across the interior of a tire held by the tire holder assembly 10 of the apparatus, the same extending normal to and across the corresponding dual jacks 16 and usually being manually operable, as by means of handle mechanisms indicated schematically at 40, so their tire bead contacting members 39a can be extended and retracted at will.

The embodiment of apparatus shown in FIGS. 17 and 18 is cryogenic in the sense that the tire is subjected to deep freezing immediately prior to being cut. In the form illustrated, an approximately three-quarters circular, i.e. 135°, hood 41 is mounted on a wheeled carriage 42, that is supported by the rearwardly extending portion 11b of frame 11 of the apparatus of FIG. 1, so as to be movable over and away from the tire holder assembly 10 and tire cutter assembly 13 of FIG. 1. Articulated piping 43 leading into hood 41 at spaced locations from a source 43a of a freezing agent, such as liquid nitrogen, supplies such freezing agent to the tire rotating under the hood as indicated by the applied arrows in FIG. 17, so as to freeze the steel reinforcements in the tire and make them susceptible to shattering when contacted by the slicing blades 29, see also FIGS. 9 and 10, of the cutter assembly 13.

As shown in FIG. 18, the hood 41 is advantageously hinged, as at 44, so the forward, overlying, quarter portion 41a can be swung upwardly and rearwardly relatively to the rearward semi-circular portion 41b for installing and removing the hood by manually pushing carriage 42 forwardly and rearwardly, respectively, relative to the remainder of the apparatus.

Figure 20:
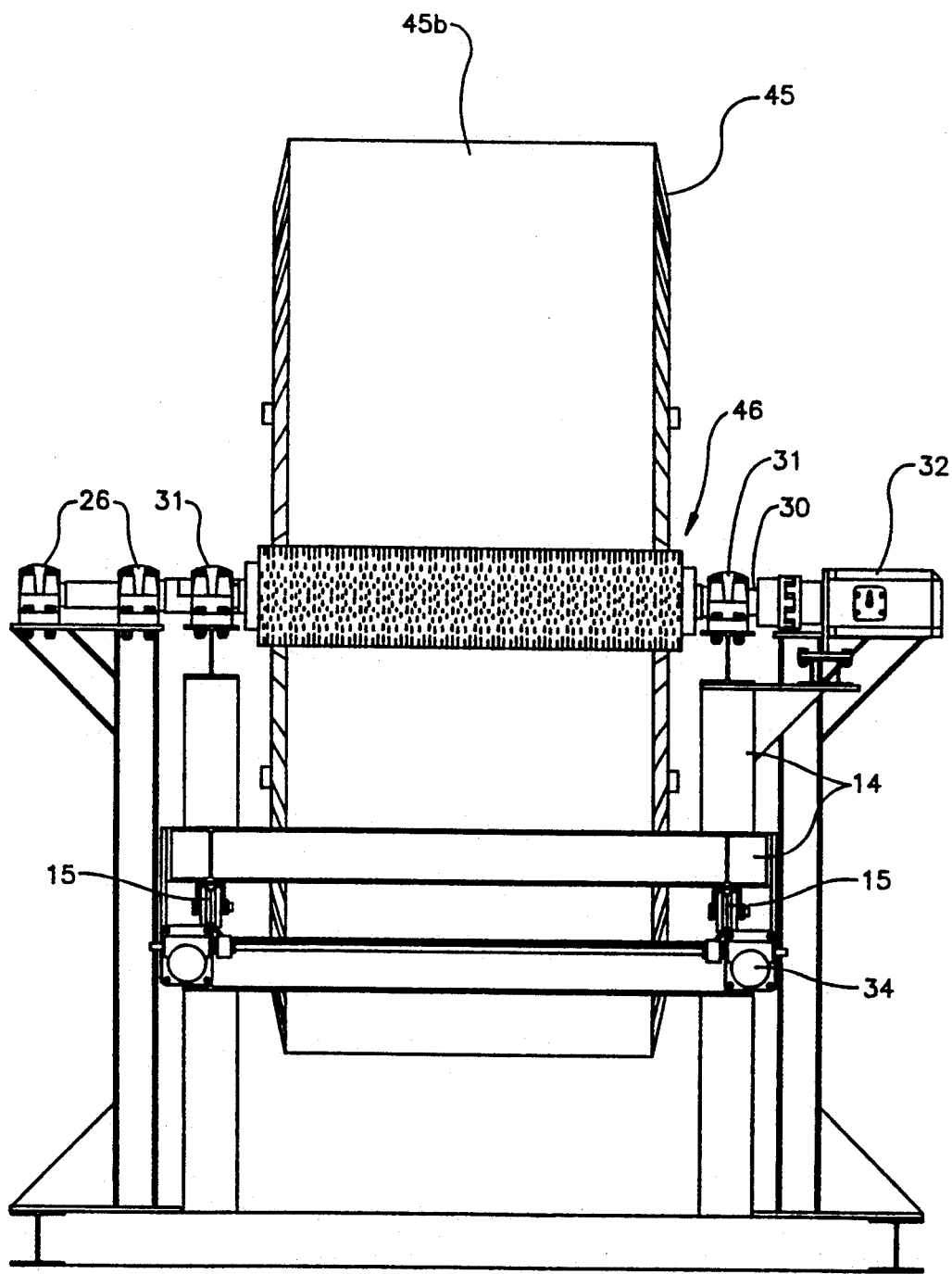
Figure 21:
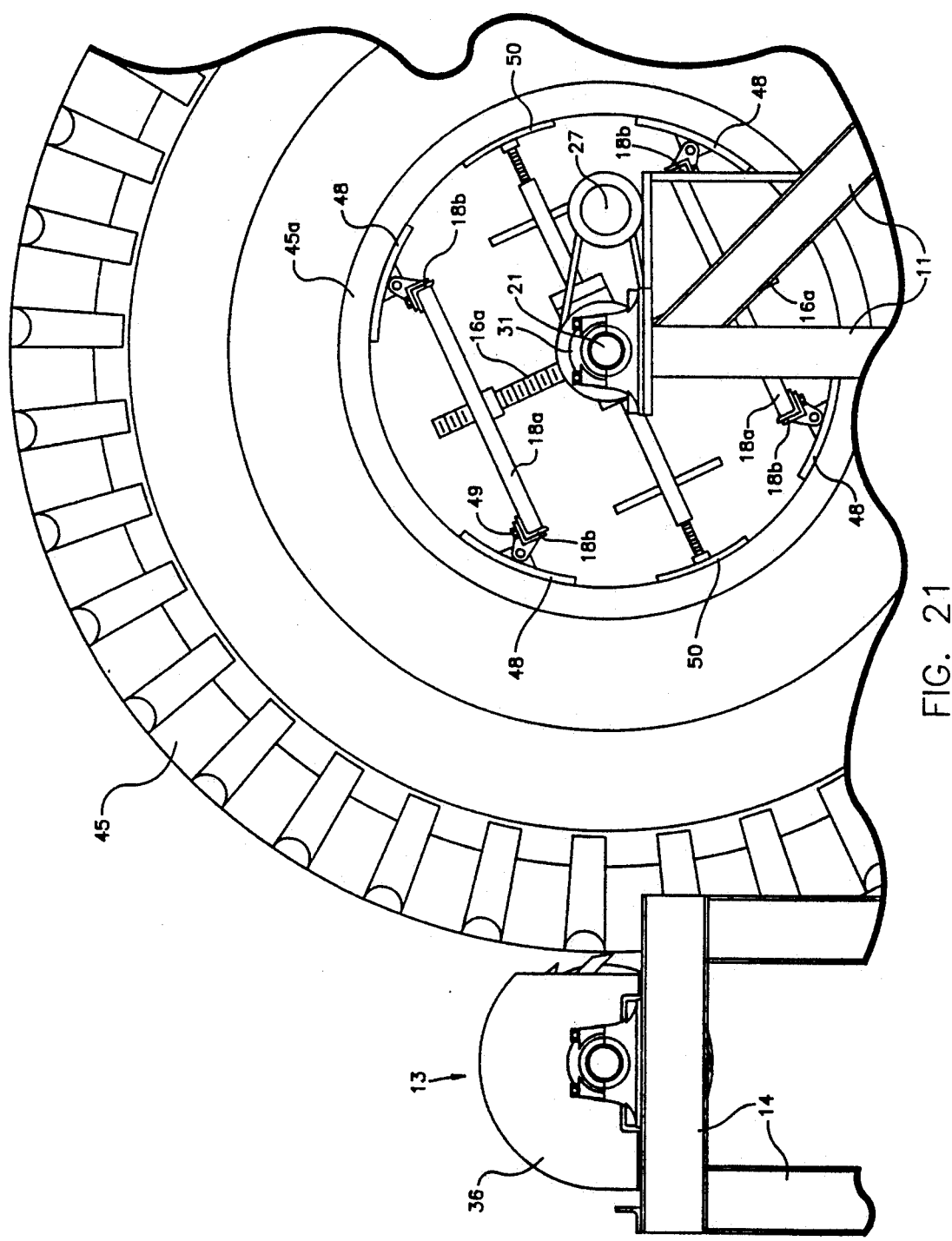

In working on tires that are recappable, following the initial slicing of the tread portion of such a tire, see 45, FIGS. 20 and 21, the tire cutter assembly 13 is replaced by a wire brush and buffer assembly 46 following initial slicing of the tread portion. Assembly 46 comprises a usual type of elongate cylindrical wire brush 46a rigidly mounted on a shaft 47 corresponding to the shaft 30 that is journaled in the bearings 31 and driven by the motor 32.

Since the tire 45 is to be remounted on the usual receiving rim of the wheel, care is taken to preserve the integrity and true circular formation of the mounting beads 45a, FIG. 21, of the tire during both the slicing of particles from the tread and the buffing of the residual cut surface 45b, FIG. 20. For this purpose, the bead-contacting corners tire bead clamping means at the ends of frames 18 have properly curved, bead-conforming, elongate, bead-contacting attachments 48, FIG. 21, temporarily attached thereto as by means of bolts 49, while the members 39a of the pair of dual jacks 39, as here manually operated, have their bead-contacting ends properly curved in conformity with bead curvature by bead-contacting attachments 50.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. Apparatus for slicing particles from a discarded vehicle tire for either disposing of such tire or preparing it for recapping, comprising supporting structure provided with rotatable shaft members formed to matingly receive interposed shaft means and spaced apart for receiving a tire holder assembly; mounting structure for means operative on a vehicle tire, said supporting structure and said mounting structure being operationally positionable relative to each other for operating on a vehicle tire held by the received tire holder assembly; and a tire holder assembly for mounting in said supporting structure, said tire holder assembly comprising a paired set of dual, radial, tire-holding jacks; jack operating mechanism including elongate arbor structure arranged so that each of the corresponding jacks of the dual jacks of said set operates on a corresponding one of the side wall beads of a received tire, corresponding jacks of said dual jacks of said paired set having mutually spaced, elongate, tire side wall bead clamping means arranged oppositely with respect to said jack operating mechanism, and both of those paired dual jacks making up said set of same being mounted in common by and spaced apart along said arbor structure which has opposite shaft ends configured for mating with said spaced apart rotatable shaft members of said supporting structure, so that said tire holder assembly and said arbor structure may be conveniently and quickly replaced in the apparatus.

2. Apparatus in accordance with claim 1, including a cutter blade assembly rotatably mounted on the mounting structure, said cutter blade assembly comprising a series of cutter disks rigidly held side-by-side on shaft means for rotation in common, each of said cutter disks having at least one cutter blade of chisel formation extending circumferentially therefrom, and the cutter blades of said series of cutter disks being offset laterally from one another to form a helically oriented series of blades.

3. Apparatus in accordance with claim 2, wherein there is additionally provided a retractable hood arranged for positioning over the tire holder assembly so as to cover a tire held by said assembly as it is being cut; means for retracting and advancing said hood relative to said assembly and to a tire held by said assembly; and means for introducing a cryogenic substance under said hood for superficially freezing exposed surfaces of the tire as the cutting proceeds.

4. Apparatus in accordance with claim 1, wherein each of the opposite, matingly configured shaft ends of the arbor structure is substantially semi-circular relative to the shaft diameter and has a mating formation extending longitudinally thereof which has longitudinally spaced, transverse openings for receiving respective holding pins, and wherein the rotatable shaft members of the supporting structure are configured for mating with said matingly configurated shaft ends of the arbor structure.

5. Apparatus in accordance with claim 4, wherein the holding pins are respective bolts.

6. Apparatus in accordance with claim 4, wherein the mating formation is of V-shape in transverse cross-section.

7. Apparatus in accordance with claim 1, wherein the tire holder assembly includes elongate, rigid, tire bead clamping frames at opposite sides of the arbor structure and in which corresponding jacks of the dual tire-holding jacks of the paired set are operatively mounted, respectively, for clamping corresponding beads of a received tire, opposite ends of opposite ends of each of said frame being spaced apart to span respective chords of the circumference of corresponding beads of the received tire.

8. Apparatus in accordance with claim 7, wherein the tire holder assembly comprises, for each of the dual tire-holding jacks of the paired set, an additional dual tire-holding jack extending substantially normal to the accompanying dual jack and providing for additional, intermediate, clamping action against mutually opposite portions of the corresponding bead of the tire.

9. Apparatus in accordance with claim 1, wherein the tire holder assembly is fixed relative to the mounting structure, and said mounting structure is movable toward and away from the fixed tire holder assembly.

10. Apparatus in accordance with claim 1, wherein the arbor structure comprises an elongate housing within which tie jack operating mechanisms are disposed, and wherein the opposite shaft ends of the arbor structure are stub shafts extending from opposite ends of said housing.

11. Apparatus in accordance with claim 1, including hood means mounted around the tire holder assembly; and means for injecting a cryogenic substance under said hood means for freezing the tire to be cut.

12. Apparatus in accordance with claim 11, wherein the hood means is mounted separately from the remainder of the apparatus so as to be removable therefrom and replaceable thereon.

13. Apparatus in accordance with claim 1, wherein buffer brush assembly is mounted by the mounting structure.

14. Apparatus for slicing particles from a discarded vehicle tire for either disposing of such tire or preparing it for recapping, comprising a tire holder assembly; and mounting structure for means operative upon a vehicle tire, said tire holder assembly and said mounting structure being operationally positionable relative to each other for operating on a vehicle tire held by the received tire holder assembly; and a tire holder assembly comprising a paired set of dual, radial, tire-holding jacks; jack operating mechanism including elongate arbor structure arranged so that each of the corresponding one of the side wall beads of a received tire, corresponding jacks of said dual jacks of said paired set being operationally mounted in opposite ends, respectively, of elongate, rigid, clamping frames that are included in said tire holder assembly and have tire bead clamping frame members arranged oppositely with respect to said jack operating mechanism, both of said frames being mounted by and spaced apart along and at opposite sides of said arbor structure for clamping corresponding beads of a received tire, opposite ends of opposite ends of each of said frames being spaced apart to span respective chords of the circumferences of corresponding beads of the received tire.

15. Apparatus in accordance with claim 14, including a cutter blade assembly rotatably mounted on the mounting structure, said cutter blade assembly comprising a series of cutter disks rigidly held side-by-side on shaft means for rotation in common, each of said cutter disks having at least one cutter blade of chisel formation extending circumferentially therefrom, and the cutter blades of said series of cutter disks being offset laterally from one another to form a spirally oriented series of blades.

16. Apparatus in accordance with claim 15, wherein there is additionally provided a retractable hood over the tire holder assembly positioned so as to cover a tire held by said assembly; means for retracting and advancing said hood relative to said assembly and a tire held by said assembly; and means for introducing a cryogenic substance under said hood for freezing the tire being cut.

17. Apparatus in accordance with claim 14, wherein the tire bead clamping means of each of the dual tire-holding jacks of the paired set are adapted to span respective chords of the interior circumference of the tire and wherein the end portions thereof are adapted to contact the corresponding bead of the tire at opposite ends of the spanned chord.

18. Apparatus in accordance with claim 14, wherein there are additionally provided, for the end portions of the elongate tire bead clamping means that contact the corresponding bead of the tire at opposite ends of the spanned chords, elongate members curved in conformity with the respective arcuate portions of the tire bead contacted thereby.

19. Apparatus in accordance with claim 14, wherein the tire holder assembly comprises, for each of the dual tire-holding jacks of the paired set, an additional dual tire-holding jack extending substantially normal to the accompanying dual jack and providing for additional, intermediate, clamping action against mutually opposite portions of the corresponding bead of the tire.

20. Apparatus in accordance with claim 19, wherein there are additionally provided, for the tire bead clamping means of the additional dual tire-holding jack, members curved in conformity with the respective arcuate portions of the tire bead contacted thereby.

21. Apparatus in accordance with claim 14, wherein a buffer brush assembly is mounted by the mounting structure.

22. Apparatus in accordance with claim 14, wherein the arbor structure comprises an elongate housing within which the jack operating mechanisms are disposed, and wherein the opposite ends of the arbor structure are stubs shafts extending from opposite ends of said housing.

* * * * *